United States Patent [19]

Borrelli et al.

[11] 4,403,031

[45] Sep. 6, 1983

[54] METHOD FOR PROVIDING OPTICAL PATTERNS IN GLASS

[75] Inventors: Nicholas F. Borrelli, Elmira; David L. Morse, Corning, both of N.Y.

[73] Assignee: Corning Glass Works, Corning, N.Y.

[21] Appl. No.: 277,089

[22] Filed: Jun. 25, 1981

[51] Int. Cl.$^3$ ................................................ G03C 5/24
[52] U.S. Cl. .................................. 430/332; 430/337;
430/339; 430/338; 430/321; 430/328; 430/330;
430/272; 430/414; 430/417; 430/496; 430/523
[58] Field of Search ............... 430/350, 351, 352, 353,
430/372, 373, 374, 402, 428, 414, 417, 13, 5,
495, 321, 496, 401, 338, 332, 337, 339; 65/60

[56] References Cited

U.S. PATENT DOCUMENTS

| | | | |
|---|---|---|---|
| 2,326,012 | 8/1943 | Dalton | 430/13 |
| 2,422,472 | 6/1947 | Dalton | 430/523 |
| 3,445,230 | 5/1969 | Francis | 430/414 |
| 4,017,318 | 4/1977 | Pierson et al. | 106/52 |
| 4,181,750 | 1/1980 | Beckenbaugh et al. | 430/417 |

FOREIGN PATENT DOCUMENTS 1519701  8/1978  United Kingdom .

OTHER PUBLICATIONS

T. F. Deutsch, et al.: Appl. Phys. Lett., 35(2), Jul. 15, 1979, pp. 175-177.
P. M. George, et al.: Thin Solid Films, 67 (1980), pp. L25-L28.
S. D. Allen, et al.: J. Vac. Sci. Technol., 16(2), Mar.-/Apr. 1979, p. 431.
Chem. Abstract, vol. 89, 1978, 97874m.

*Primary Examiner*—Won H. Louie, Jr.
*Attorney, Agent, or Firm*—K. van der Sterre

[57] ABSTRACT

Optical patterns formed by localized optical density or refractive index variations in glass are produced by impregnating a porous glass support with a photolyzable organometallic compound and selectively exposing the glass to a photolyzing light source to cause the photolytic decomposition of the organometallic compound in exposed portions of the glass. The patterns are fixed, if desired, by removing unreacted organometallic compound from the pores.

38 Claims, 5 Drawing Figures

METHOD FOR PROVIDING OPTICAL PATTERNS IN GLASS

BACKGROUND OF THE INVENTION

The present invention is in the field of optics and relates generally to methods for producing selected optical patterns in glass. The patterns may comprise visible optical images formed by variations in optical density, patterns formed by refractive index variations, or patterns formed by a combination of optical density and refractive index variations. Products obtainable in accordance with the invention include photographic reproductions in glass, other optical images or patterns of very high resolution, gradient index lenses, diffraction gratings, and a variety of other useful optical devices.

The concept of treating a glass article to develop patterns or photographic images therein is old, an early reference to this concept being provided by U.S. Pat. Nos. 2,326,012 and 2,422,472. These patents disclose a process wherein glass is melted with certain constituents designed to impart photosensitivity to glass articles produced from the melt. Images are then formed directly in the resulting glass by first exposing the glass to light and thereafter heat treating the exposed glass to develop visible images therein. Many subsequent patents directed at improvements upon this concept have issued, a recent example being U.S. Pat. No. 4,017,318.

While the foregoing patents have as their object the formation of images in optical density in glasses, there have also been attempts to form patterns in refractive index in glasses, that is patterns formed by localized modifications in the refractive index of the material. U.S. Pat. No. 4,110,093 and British Pat. No. 1,519,701 describe techinques for forming a refractive index gradient across a glass rod or other article by impregnating a porous glass preform with a refractive-index-modifying dopant. The distribution of the dopant is then adjusted and it is encased in the glass by a consolidating heat treatment. Unfortunately, refractive index patterns which can be so obtained in this manner are limited to those resulting from diffusion processes.

Photolyzable organometallic compounds are known to be useful for the preparation of photosensitive media, and have been considered as an alternative to precious metal-containing emulsions. V. I. Gorunov et al. describe, in *Avtometriya* (1978) (1) 71-3 [C.A. 89, 97874M], the preparation of light sensitive sheets or films comprising metal carbonyl compounds wherein permanent optical density changes can be induced by exposure and prompt thermal or physical development.

It has also been proposed to deposit metal film patterns on planar substrates such as glass utilizing organometallic compounds including metal carbonyls and metal alkyls. One method for providing such films is laser-induced chemical vapor deposition, as described by S. D. Allen et al., J. Vac. Sci. Technol., 16(2), March/April 1979, page 431. An alternative method involves the use of a laser to induce photolytic decomposition of metal alkyls or metal carbonyls, as disclosed by P. M. George et al., Thin Solid Films, 67 (1980), pages L25-L28, and T. F. Deutsch et al., Appl. Phys. Lett. 35(2), July 15, 1979, pages 175-177.

SUMMARY OF THE INVENTION

The present invention involves a new technique which produces optical patterns or images directly in glass, using photolyzable organometallic compounds to impart the photosensitivity necessary for faithful recording of an exposure image or pattern. The method of the invention characteristically permits the formation of very high resolution patterns or images, either in optical density or in refractive index, which can be permanently retained in a glass matrix of very high chemical and physical durability. The technique also facilitates refractive index or optical density grading for optical or photographic applications where a particular refractive index distribution or shading effect is desired.

The advantages of the method of the invention result from the use of porous glass as the matrix or support for the photolyzable organometallic compound. We have found that surface hydroxyl groups on the pore surfaces of porous glass are quite reactive with respect to photolyzed intermediates of organometallic compounds, such that glass/organometallic coordination complexes are readily formed at locations where photolytic decomposition of the organometallics has been induced. The formation of this complex retards migration and/or deactivation of the intermediate, particularly during the removal of unreacted compound, a factor which is thought to aid in avoiding the losses in pattern contrast and/or resolution which can occur in other support media.

Even where a photolyzed intermediate of an organometallic compound may not form a complex with the glass support, the fact that the starting compounds are held in discrete areas and are therefore non-agglomerated results in a well dispersed intermediate which is stable against migration after exposure and readily provides a high resolution photolyzed image. The pore structure of porous glasses formed by phase separation and leaching is sub-microscopic (pore diameters are below a micron and typically below 150 Å), with the pores forming a web-like interconnected structure wherein molecular migration of photoreacted species on a scale producing observable pattern shifts is unlikely in the absence of large physical or electrical driving forces.

Broadly stated, then, our invention comprises a method for producing an optical pattern in glass which comprises the initial steps of impregnating at least a portion of a porous glass article with a photolyzable organometallic compound and exposing at least the impregnated portion to a patterning source of photolyzing light to cause photolytic decomposition of the organometallic compound to a photolyzed metal-organic intermediate in a pattern corresponding to the exposure. Preferably, the organometalic compound employed will be one which produces a reactive intermediate on exposure which is capable of forming at least a coordination complex with the pore surfaces of the glass. The formation of such a complex is believed to play a helpful role in insuring high resolution in the optical images ultimately obtained.

In some cases the product of the above process exhibits an optical image of sufficient definition to be useful without further treatment. For most applications, however, additional processing will be used to fix or visually enhance the image in more definite or permanent form.

Fixing in some way is desirable because organometallics left in the glass in unreacted form may be subject to unwanted photolysis following the initial exposure step, or may decompose via auto-oxidation or spontaneous reaction with pore surface hydroxyls, degrading the resolution of the original image. Thus the method of the invention preferably includes a fixation step, following exposure to the photolyzing light source, which comprises removing residual (unreacted) organometallic compound from the pore structure of the glass. Heating is normally a suitable procedure for accomplishing such removal.

Other processing of the image produced as above described is possible for purposes such as intensifying the image, modifying the optical density or refractive index of image or background areas, and consolidation of the porous glass to permanently encase the image in a glass matrix. Intensification of the image, for example, by treatment with a solution of an easily reducible absorbing ion such as a silver nitrate solution is possible, as is image modification or intensification by thermal oxidation of the bound metallic complex, or oxidation or reduction of the bound metal to change its oxidation state. Further image processing techniques will become apparent from the following description.

BRIEF DESCRIPTION OF THE DRAWINGS

The invention may be further understood by reference to the DRAWINGS, wherein.

DETAILED DESCRIPTION

For the purposes of the present description an optical pattern is a pattern formed by a non-uniform distribution of optical density or refractive power in a glass article. As the foregoing description suggests, a wide variety of optical patterns in refractive index or optical density can be provided in accordance with the invention. The distribution of index or density-modifying species is in fact limited only by the exposure pattern obtainable in a porous glass article of a particular configuration to be treated. For thick pieces, absorption of the photolyzing light by certain useful organometallic compounds can limit the depth of penetration of the photolyzing light into the glass, but three dimensional patterns of substantial depth can readily be produced in other selected glass/organometallic systems.

Examples of patterns which can be obtained are photographic images, with faithful grey scale reproduction, gradients in refractive index, and fine line patterns in optical density or refractive index wherein the patterns exhibit sub-micron resolution. Products which can be made by the method of the invention include gradient index lenses, optical couplers, optically produced diffraction gratings in flat glass, lens or pseudo-fiber optic arrays in flat glass, photomasks for microcircuit fabrication or the like, and a variety of other products requiring complex and/or high resolution optical density or refractive index patterns.

Photolyzable organometallic compounds are, for the purposes of the present description, organometallic compounds which undergo bond scisson on exposure to light to produce a photolyzed metal-organic intermediate. Preferably, the intermediate is a reactive intermediate, defined as an intermediate capable of reacting with the pore surfaces of porous glass via hydroxyl groups present thereon to form at least a coordination complex, or a stronger bond, with the glass surface. Typically the reactive intermediate is a coordinately unsaturated organometallic complex produced as follows:

or a metal-centered radical produced as follows:

each resulting from the removal of at least one organic group or halogen from the organometallic starting compound.

In the case of the metal-centered radical, reaction with the glass can occur as follows, to form a covalent bond:

A coordinatively unsaturated organometallic $[L_{x-1}M]$ reacts similarly but typically forms a coordination complex with the glass. Of course, multiple organic groups can be removed from the organometallic compound during photolysis without adversely affecting the reactivity of the intermediate or the imaging capability of the system.

For the purpose of the present description a porous glass is a glass incorporating, in at least a portion of the volume thereof, a multiplicity of interconnected pores of sub-micron diameter into which the photolyzable organometallic compound can be introduced as a liquid or a gas. Pore diameters in such glasses will typically be smaller than a micron, preferably in the diameter range of about 5–150 Å.

Porous glasses are well known and can be produced by a number of different methods, including a soot deposition technique as suggested in U.S. Pat. No. 3,859,073 or a phase separation and leaching technique as described in U.S. Pat. Nos. 4,110,093, 3,938,974, 2,106,744, 2,215,036 and 2,221,709. Preferably the glass is produced by a phase separation and leaching technique as disclosed in the latter of the above patents.

Porous glasses utilized in accordance with the invention are most preferably high silica glasses, meaning glasses containing at least about 90% silica by weight and more typically at least about 95% silica by weight. Porous glasses of this type are available commercially for example, from Corning Glass Works, Corning, N.Y. 14831 (under the trade name VYCOR®), and are known in the art as 96% silica glasses although the silica content thereof may vary somewhat from the 96% level.

Photolyzable organometallic compounds suitable for use in accordance with the invention are compounds of metals of groups IIIB, IVA, IVB, VB, VIB, VIIB and VIII of the Periodic Table. The most common and well known of these compounds are the transition metal carbonyls; however, other compounds such as metal alkyls and metal-organic ring compounds are known to be photosensitive and may suitably be employed.

Solid organometallic compounds can conveniently be loaded into porous glass either by sublimation, if sufficiently stable in vapor form, or in dissolved form in a suitable solvent. Similarly, liquid organometallics can be directly loaded in liquid form, or vaporized if stable at the boiling point. Any suitable solvent for the selected organometallic can be used, including for example, methylene chloride ($CH_2Cl_2$), ethanol, n-pentane, tetrahydrofuran, or the like.

Impregnation of the porous glass can be complete, so that the entire bulk of the glass article contains the organometallic compound, or it can involve only a selected portion of the glass, such as a surface layer. Preferably, the organometalic compound selected for use will not be so unstable that decomposition and reaction with the glass will occur spontaneously upon contact with the hydroxyls present on the pore walls thereof. However, if such a spontaneous interaction is sufficiently slow, photolysis followed by rapid removal of the unreacted organometallic compound can still yield a useful optical image.

By exposure of the impregnated porous glass article to a patterning source of photolyzing light is meant exposure to light in a manner which forms an exposure pattern in the glass. This is a selective exposure, but it can be either simultaneous, i.e, produced using the light in combination with a photographic negative or other optical mask, or it can be sequential, e.g. carried out with a moving light beam using a scanning process or the like.

The photolytic decomposition occurring in exposed areas may be partial or complete, depending upon the intensity and duration of the exposure treatment. It is a significant advantage of the method of the invention that the extent of an optical density or refractive index change in the glass closely corresponds to the extent of photolytic decomposition of the organometallic compound, which can be controlled by the exposure treatment. Thus the method facilitates faithful reproduction of gray scale patterns in optical density or refractive index pattern copies.

Light sources which can be used in accordance with the invention include any source effective to induce localized photolytic decomposition of the organometallic compound selected for use in the method. Many photolyzable organometallic compounds are most efficiently decomposed by ultraviolet light, e.g., light in the 230–400 nm wavelength range, where the absorption of light by the compounds is high. However, visible light may be used in many cases, even if less efficient, and particularly where deep penetration of the photolyzing light into the impregnated glass is desired.

Of course it is also possible to utilize other sources of radiation as equivalents for the purpose of causing photolysis of the organometallic compounds in the glass. Examples of such sources include electron beams, X-ray generators, high energy particle beams, or the like.

The image resulting from the selective photodecomposition of the organometallic compound in the glass may be latent or visible, depending upon the compound selected for use. In most cases an image at least in refractive index is visible immediately following exposure, and such images can be directly used if desired. However, it is normally preferable to enhance the permanence of the image by development or fixing.

With some organometallic compounds, such as iron carbonyl, [$Fe(CO)_5$], treatment of the exposed glass with a solution of an easily reducible ion of a light absorbing metal solution, e.g., a solution of silver nitrate in ethanol, results in a visible intensification of the refractive index image via a reduction of $Ag^+$ to $Ag°$ in photolyzed areas. Experimental evidence suggests this occurs in a 1:1 ratio with the photolyzed intermediate in the glass. The result is an optical density image of high resolution in metallic silver, wherein resolved patterns in 0.8 micron lines are achievable.

The preferred fixing techinique, which can also provide visible intensification of the photolyzed image, is heating. Depending on the organometallic compound selected, heating is typically effective to at least partially remove unreacted organometallic compound from the pore structure of the glass, while leaving the photolyzed material unaffected or causing further decomposition thereof, thus providing composition variations in the pore volume of the glass. If the heating is sufficient to cause decomposition, the image is frequently modified as to optical density or refractive index, but is not adversely affected as to resolution or gradation. Thus, enhanced visibility of the refractive index or optical density of the image, as well as permanent fixation, can result from a heating step.

Some organometallic compounds which can usefully be employed in accordance with the invention are prone to oxidation in the presence of air, and can decompose on heating or even at ambient temperatures in the porous glass environment. This tendency toward oxidation can be mitigated in some cases by carrying out the loading, exposure, and fixing steps under an inert atmosphere such as dry nitrogen.

It is, of course, well known that porous glasses can be consolidated by heating and we have found that in many cases such consolidation can be accomplished without any degradation in image resolution or intensity. Even images in high-silica glasses, which glasses require temperatures on the order of 1200° C. for full consolidation, can be successfully sealed in the glass in this manner.

Finally, thermal oxidation and reduction treatments have been found useful, both before and after consolidation, to modify the character of the generated image. The oxidation state of the bound metal can frequently be modified to convert an oxide image to a metal image and vice versa, resulting in significant changes in optical density and refractive power in the treated image.

The following detailed examples will more fully illustrate the preparation of glass articles incorporating optical patterns in accordance with the method of the invention.

EXAMPLE I

An example of an organometallic compound of a Group IVB metal suitable for use in the invention is iodotrimethylstannane [trimethyl tin iodide, $(CH_3)_3SnI$]. This compound is a colorless lquid (b.p. 170° C.) in the pure state, but frequently exhibits a yellow coloration due to the presence therein to an iodine decomposition product. Photolysis of this compound can be achieved by exposure to ultraviolet light at a wavelength of 320 nm or below. The photolysis reaction is thought to yield free iodine and $(CH_3)_3Sn$ radicals, with the latter deemed capable of reacting rapidly with hydroxyl groups on the pore walls of porous glass to yield a covalently bonded tin complex.

To produce a light-refracting lens element of very small dimensions in a glass plate using this compound, a section of a 2.0 mm thick glass plate of porous Corning Code 7930 glass, about 1"×1" in size, is dipped into a solution consisting of one part $(CH_3)_3SnI$ and 5 parts methylene chloride (CH$_2$Cl$_2$) by volume. The solution quickly penetrates throughout the pore structure of the glass. Upon removal of the glass from the liquid, the impregnated glass exhibits a slight yellow coloration due to the presence of free iodine therein. This iodine and the methylene chloride solvent can readily be removed without expelling the organometallic compound by heating the impregnated glass at 150° C. for a few minutes, if desired.

To produce a refractive index change in the glass resulting in a light-refracting lens pattern therein, the impregnated section of the plate is exposed through its thickness to an ultraviolet light source consisting of a focused xenon arc lamp at an incident power level of 500 watts for an interval of 60 minutes. Exposure is carried out through a multi-aperture exposure mask consisting of 0.5 mm holes spaced 0.25 mm apart.

This photolysis step produces free iodine and bound tin complexes in exposed portions of the glass. Because the exposing light is convergent rather than collimated, light through each aperture generates a 3-dimensional exposure zone within the volume of the glass which is not cylindrical but roughly conical, having the configuration of a truncated cone with its base at the exposure aperture. After removal of the free iodine by heating as above described, these zones appear as small lens-like elements forming an array in the glass plate.

To fix this lens-like refractive index pattern in the porous glass, the glass is heated to about 600° C. for 15 minutes. This heating expels unreacted (CH$_3$)$_3$SnI from the pore structure of the glass, and at the same time removes organic constituents from the bound tin by a process of oxidation. No migration of the bound tin or loss in the resolution of the refractive index pattern produced by photolysis is observed to result from this heating. Thus a refractive index pattern closely corresponding to the pattern induced during the photolysis step remains in permanent form in the porous glass.

Because of the relatively high loading of tin resulting from the reported impregnation step, some opalescence can be observed in high refractive index regions of the glass following the fixing step. This opalescence, attributed to the formation of SnO$_2$ during heating, is not normally observed at lower tin loadings. If desired, it can readily be removed by heating the glass in a reducing atmosphere, e.g., hydrogen or forming gas (8% H$_2$, 92% N$_2$ by volume), at a temperature of 600° C. for five minutes, a treatment effective to reduce the SnO$_2$ to SnO.

Figure 1:
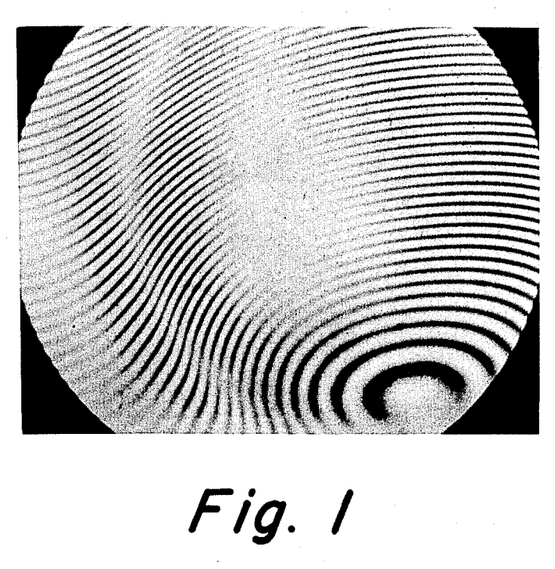
FIG. 1 is an interferogram of a small graded-index lens element provided in accordance with the invention.

An interference photomicrograph of a typical glass-encased lens element resulting from the above-described process is shown as FIG. 1 of the drawing. That figure consists of a photomicrograph, taken at a magnification of 200 diameters through a refractometer, of a portion of single graded-index lens element having an actual diameter of 0.5 millimeters produced as above described. As can be seen from the micrograph, the refractive index difference between the center of this lens element and the surrounding glass matrix results in an observed difference of about 15 diffraction fringes at the illumination wavelength of 600 nm. This corresponds to a refractive index difference of about 0.0045 between the center of the lens element and the surrounding glass.

If desired, it is possible to consolidate porous glass containing a refractive index pattern produced in the manner above described, without modifying the pattern except for shrinkage due to matrix consolidation, to produce a non-porous refracting device. A typical consolidation treatment involves heating the porous glass from ambient to 1225° C. at 100°/hr., holding at 1225° C. for 15 minutes, then cooling. At higher tin loadings, such consolidation may result in reopalization of the high index regions in the glass, producing a light-scattering pattern in the glass due to the refractive index difference between the glass matrix and a crystalline phase associated with the bound tin.

It is also possible to transform the refractive index pattern into a pattern in optical density by carrying out the consolidation step in a reducing atmosphere, for example H$_2$ or forming gas. Consolidation under these conditions reduces the bound tin to a metallic state, resulting in a black pattern in the consolidated glass corresponding exactly, except for shrinkage, to the refractive index pattern originally produced by photolysis.

EXAMPLE II

A refractive index pattern corresponding to an array of circular high-index regions in a lower index field is provided utilizing a procedure analogous to that employed in Example I. A porous glass plate of Corning Code 7930 glass is dipped in a 2% (weight) solution of (CH$_3$)$_3$SnI in methylene chloride (CH$_2$Cl$_2$) to impregnate the pore structure thereof. The impregnated glass is then heated to 100° C. for 15 minutes to drive off the methylene chloride solvent and free iodine, with pure trimethyl tin iodide being retained in the pore structure of the glass.

The impregnated glass thus provided is exposed to an ultraviolet light source as in Example I for 60 minutes through a multi-aperture exposure mask comprising 0.3 mm circular apertures spaced 0.32 mm apart. Following this exposure, the glass is heated to 600° C. for 5 minutes to fix the refractive index pattern, expelling unreacted trimethyl tin iodide and organic constituents from the glass and leaving only tin oxide in the pores.

Figure 2:
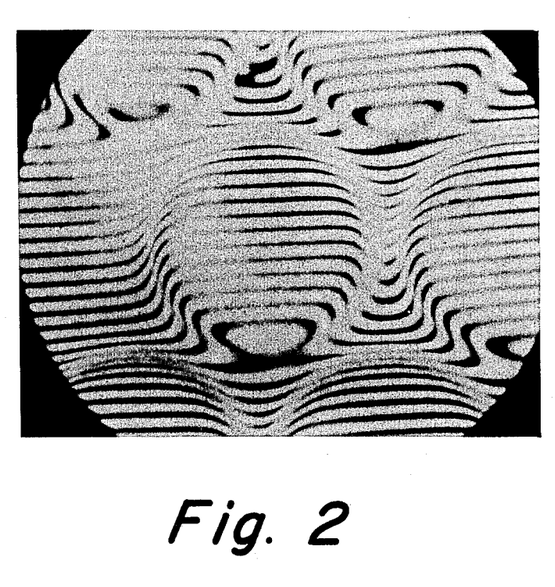
FIG. 2 is an interferogram of an array of lens-like elements provided in accordance with the invention.

The product of this process is illustrated in FIG. 2 of the drawing. FIG. 2 is a photograph of the plate taken through a refractometer at an enlargement of about 100 diameters, wherein the circular high-index regions produced in the low index porous glass matrix are clearly observable. The refractive index difference resulting from the photolysis and fixing steps corresponds to about 4 fringes at 600 mm, for a refractive index difference between the high index and low index regions of about 0.0012.

Figure 3:
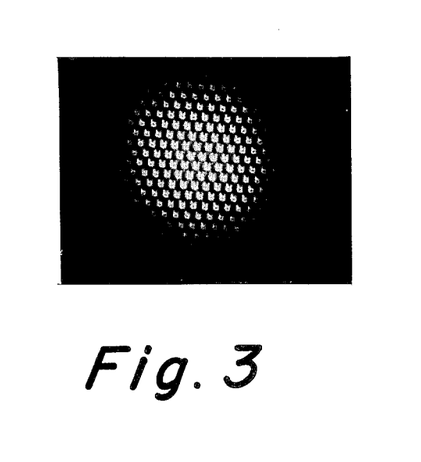
FIG. 3 shows an image array provided using a lens array produced according to the invention.

The light focusing behavior of a lens array produced in the manner described is illustrated in FIG. 3 of the drawing, which was produced in the following way. A black-and-white mask of the alphanumeric character R, wherein the character has an actual height of 1.5 mm, is illuminated through a diffuser by a 100-watt tungsten light source. The lens array, comprising about 750 lens elements, each element about 0.3 mm in diameter, is positioned 5 cm. from the object plane formed by the illuminated mask. The real image array produced by the lens array is used as the object of a 50 mm focal length (f1.8) projections lens spaced 100 mm from the array, with the image formed by the projection lens being photographed by a camera spaced 1 meter from the projection lens. FIG. 3 shows the multiple image array photographed in this manner, wherein the arrayed characters are quite closely resolved.

EXAMPLE III

An example of a compound of a Group VIIB metal useful in accordance with the invention, for example, to provide a refractive index pattern in a glass, is $[Mn_2(CO)_{10}]$. Photolysis of this solid compound can be achieved by exposure to ultraviolet light at a wavelength below about 370 nm, and involves a homolytic cleavage and the formation of two metal-centered $Mn(CO)_5$ radicals which are highly reactive in solution and therefore expected to react rapidly with hydroxyl groups on the pore walls of porous glass.

Although slightly unstable against oxidation in air, this compound can be loaded directed into porous glass by sublimation from the solid state. Alternatively, it can be liquid loaded after dissolving in a suitable solvent such as methylene chloride.

To load a porous glass support with this compound, a porous glass plate composed of Corning Code 7930 glass as in Example I is placed in a sealed flask containing solid $[Mn_2(CO)_{10}]$ under a vacuum of 1 mm (Hg) and at a temperature of 50° C. The carbonyl vapors evolved in the heated flask enter the pore structure of the glass. This impregnated technique concentrates the organometallic compound in the pore structure near the surface of the glass, with satisfactory loading of the porous surface layer being accomplished under the recited conditions within an exposure interval of about 10 minutes.

Selective spot exposure of the impregnated glass produced as described is achieved under a light source consisting of an ultraviolet fluorescent lamp operating at an incident power lever of 100 watts for about 10 minutes. This exposure produces a drop in visible absorption and a localized reduction in refractive index as compared with the relatively high index of the surrounding carbonyl-impregnated porous glass. If very heavy loadings of $[Mn_2(CO)_{10}]$ are employed, a brown coloration can be generated in regions of the glass exposed to photolyzing light, a result which is attributed to the direct photolytic formation of some $MnO_2$ in the pore structure of the glass.

Fixation of the refractive index pattern formed by a selective exposure as above described can be accomplished by heating the glass to 400° C. for ten minutes. This heating step expels unreacted carbonyl from the pore structure by sublimation, and also fully oxidizes bound manganese present in the pore structure without adversely affecting the resolution of the refractive index pattern.

After fixing, regions of the exposure pattern containing bound $MnO_2$ are somewhat higher in refractive index than the surrounding matrix, which contains little or none of the oxide. This difference is observable as a shift of 2 fringes at an illumination wavelength of 633 nanometers in a refractometer. Assuming a thickness of about 0.5 mm for the $MnO_2$ impregnated layer of the sample, this corresponds to a difference in refractive index of about 0.0024 from that of the surrounding glass.

At all but the highest loadings of this organometallic compound, fixing by heating normally removes residual coloration from the glass. Thus the resulting patterns are normally due to refractive index variations rather than optical density variations.

The visible absorption of $[Mn_2(CO)_{10}]$ is of interest for two reasons. First, by virtue of this absorption, photolysis of the carbonyl can be accomplished utilizing visible light, for example, from a source such as a krypton laser. Advantageously, because absorption is not high in the visible, photolysis can extend deeply into the glass so that three dimensional patterns in refractive index are readily obtained.

Secondly, the absorption of this compound in the visible permits a rough estimate of the loading of organometallic compound obtained by various techniques, based upon the known absorption characteristics of the carbonyl in solution. Such computations indicate that there is a good correlation between the loading of manganese carbonyl initially obtained and the refractive index change resulting from photolysis of the organometallic compound. In accordance with best estimates, a 2-fringe shift was found to result from photolysis of a glass containing a $6.25 \times 10^{-3}$ molar concentration of $[Mn_2(CO)_{10}]$.

EXAMPLE IV

An example of an organometallic compound of a Group VIII metal particularly suitable for providing optical density patterns in glass is iron pentacarbonyl, $[Fe(CO)_5]$. This compound can be directly loaded into porous glass as a liquid or, more conveniently, introduced into the pore structure of the glass from the vapor phase.

The photolysis of $[Fe(CO)_5]$ can be effectively carried out by exposure to blue or ultraviolet light; deeper or three dimensional images can be achieved using visible light. Photolysis is believed to involve the loss of one or more CO groups and the formation of a coordinatively unsaturated iron carbonyl which is capable of forming a coordination complex with the glass through a reaction with hydroxyl groups present on the pore surfaces thereof.

To produce an optical density image in a porous glass plate using this compound, a plate of porous Corning Code 7930 glass as in Example I is positioned in a vessel over a quantity of $[Fe(CO)_5]$ for about 5 minutes to permit carbonyl vapors evolved at room temperature and atmospheric pressure to diffuse into the pore structure of the glass. The carbonyl vapors condense on and within the pore structure of the porous glass to provide an essentially colorless surface-impregnated plate.

A photographic resolution pattern is formed in the surface of this plate by exposing the plate through a negative photographic resolution mask to a mercury-xenon arc lamp operating at 100 watts for five minutes. The visible effect of the resulting selective photolysis is the appearance of broad band absorption and a yellow-to-brown coloration in exposed regions of the glass. The extent of coloration depends directly on the extent of the exposure, and is attributed to oxidized iron resulting from the formation of Fe—O—Si bonds on the pore walls.

The coloration resulting from exposure is intensified and the image fixed by heating the glass to temperatures above about 100° C. Heating removes carbonyl groups from the bound iron complexes and expels unreacted iron carbonyl from the pore structure of the glass. At a temperature of 400° C., all organic constituents have been removed and only Si-bound iron oxide, in the pattern of the original exposure, remains.

Figure 4:
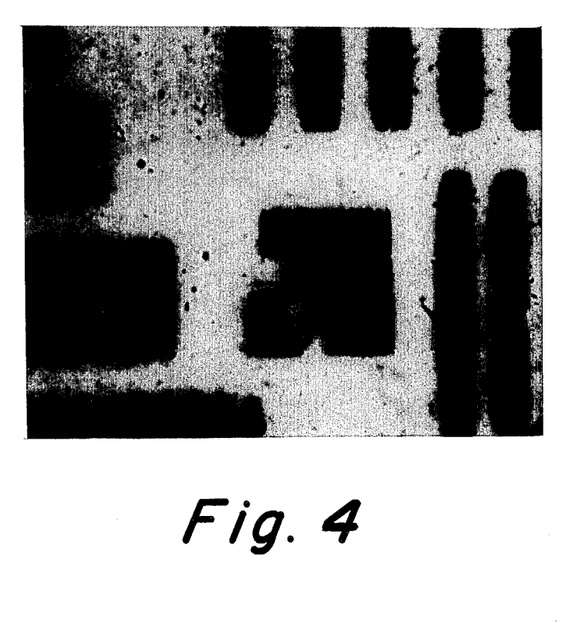
FIG. 4 shows a photographic resolution pattern imprinted in porous glass according to the invention.

An illustration of a section of a photographic test pattern produced in the manner above described is provided as FIG. 4 of the drawing. FIG. 4 is a photomicrograph of a section of the pattern taken at a magnification of 312 diameters showing the high resolution obtainable in optical patterns provided in accordance with the invention. The smallest lines in the pattern have an actual thickness of about a micron, yet are clearly resolved.

A pattern produced in accordance with the above-described procedure is a pattern in refractive index as well as optical density. Index changes of 3-5 fringes can be induced in porous glass containing iron carbonyl without completely sacrificing transparency. Higher loadings of the oxide may cause larger fringe shifts, but are so light-absorbing that refractive index measurements are difficult.

As in the case of the $MnO_2$ images described in Example III above, iron oxide images of high resolution can be encased in consolidated glass if desired. Prior to consolidation, the glass may be heated in a reducing atmosphere at temperatures of 450° C. or above to convert the oxide pattern to a metallic pattern and shift the color of the pattern towards black. Reoxidation of the iron will occur on consolidation, but reconversion to metallic iron and a blacker image can be achieved by reducing atmosphere treatments following consolidation, if desired.

EXAMPLE V

A flat glass diffraction grating is provided by generating a line pattern consisting of alternating lines of differing refractive index in a glass. A porous glass plate of Corning Code 7930 glass about 2.0 mm in thickness and 1"×1" in size is immersed in a solution consisting of about 1 g of $[Mn_2(CO)_{10}]$ in 20 ml of $CH_2Cl_2$, providing a concentration of about 0.13 molar in $[Mn_2(CO)_{10}]$.

The organometallic-impregnated glass thus provided is exposed through a photographic grating mask to a 100-watt Hg arc light source for about 5 minutes. The mask comprises alternating black and clear lines of equal width at a spacing of 500 black lines per inch.

The exposed glass is slowly heated in an electric furnace at a rate of about 100° C./hr. to a temperature of about 1225° C. This heat treatment is effective to expel unreacted $[Mn_2(CO)_{10}]$ from the glass, to convert bound manganese organometallic complexes to manganese oxide and, finally, to consolidate the porous glass.

The consolidated flat glass plate, having a consolidated thickness of 1.8 mm, incorporates a grating pattern consisting of alternating lines of differing refractive index, the difference in index between adjacent lines causing a one-fringe shift when the pattern is viewed in a refractometer under 600 nm illumination.

Figure 5:
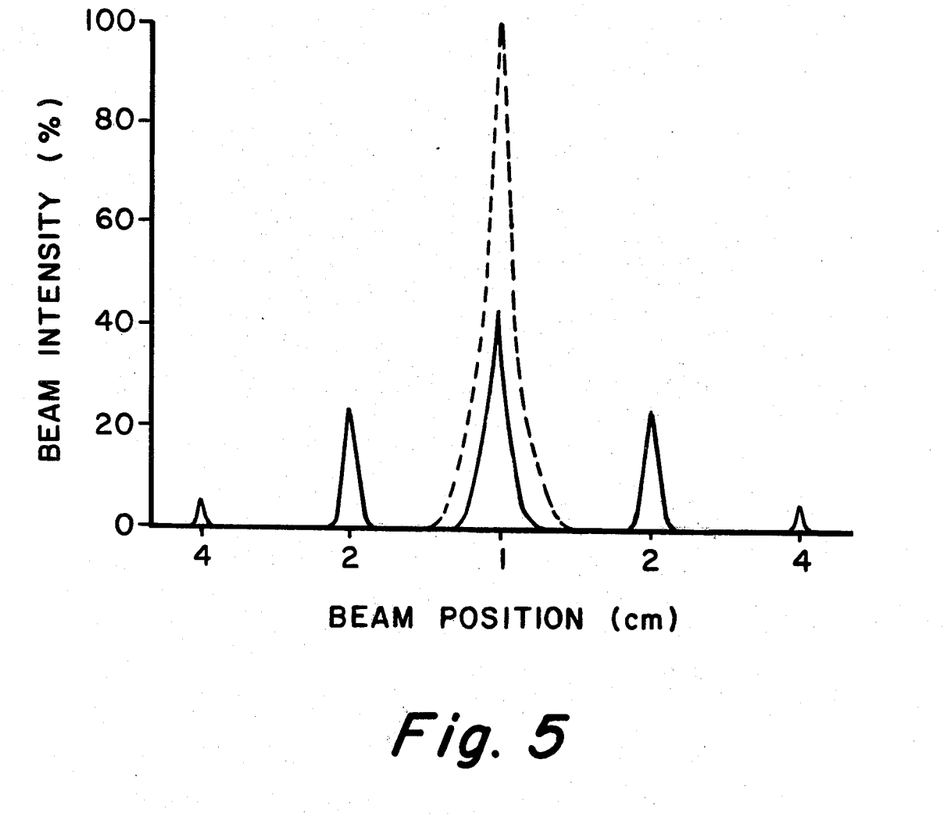
FIG. 5 illustrates the behavior of a flat glass diffraction grating provided according to the invention.

The diffracting characteristics of this grating are illustrated in FIG. 5 of the drawing. The data in FIG. 5 were generated by directing a He—Ne laser beam (wavelength approximately 633 nm) at the grating and reflecting the transmitted and diffracted light from a light-scattering screen placed 38 cm behind the illuminated glass. The vertical axis in FIG. 5 plots the intensity of the diffraction peaks (solid lines) and incident beam (broken line) as a fraction of the incident intensity, while the horizontal axis shows the displacement and distribution of the transmitted and diffracted beams. The diffracting effectiveness of the grating is clearly evident from these data.

Many other photolyzable organometallic compounds can be used to produce optical patterns in porous glass employing the techniques hereinabove described. Further illustrative compounds useful in this manner are reported in the following Table. Included in the Table are an identification of the photolyzable organometallic compound which can be used, a method for introducing the compound into porous glass, a suitable light source for photolysis, an indication of the visible effects of photolysis, if any, a fixing method which may be used, and the ultimate optical effects which can be observed to result from the process. Remarks concerning particular characteristics of the listed compounds are also provided.

TABLE

| Photolyzable Organometallic Compound | Introduction Method | Photolyzing Light Source | Initial Effect | Fixing Method | Optical Effects | Remarks |
| --- | --- | --- | --- | --- | --- | --- |
| titanocene dichloride $[Ti(\eta\text{-}C_2H_5)_2Cl_2]$ | $CH_2Cl_2$ solution | krypton laser | bleaching (orange to yellow) | heating | refractive index increase | low photoreactivity |
| $[Na(diglyme)_3]$ $[V(CO)_6]$ | $CH_2Cl_2$ solution | ultraviolet light | bleaching (green to yellow) | heating yellow | bleaching | unstable compound; load photolyze, fix under $N_2$ |
| $[W(CO)_6]$ | $CH_2Cl_2$ solution | ultraviolet light | coloration (yellow) | heating | refractive increase; coloration | relatively stable (hours) after photolysis; Mo, Cr analogs also photoreact |
| $[Re_2(CO)_{10}]$ | $CH_2Cl_2$ solution | ultraviolet light | index change | heating | index increase gray-black coloration | low photoreactivity |
| $[Ru_3(CO)_{12}]$ | $CH_2Cl_2$ solution | ultraviolet light | bleaching (orange to clear) | heating | optical density increase | low photoreactivity; low contrast imaging |
| $[Co_2(CO)_8]$ | $CH_2Cl_2$ solution | visible light | bleaching (purple to clear) | heating | refractive index increase; bleaching | unstable against autooxidation; photolyze while in dissolved form; unphotolyzed glass is blue |

Of course the foregoing Table is not an exhaustive listing of organometallic compounds which could suitably be employed in accordance with the invention. Other organometallic compounds known to be photolytically active which are candidates for such use include $[Zr\ (\eta^5-C_5H_5)Cl_2]$, $[Hf(\eta^5-C_5H_5)Cl_2]$, and compounds of the form $[M(\eta^5-C_5H_5)_2R_2]$ wherein M is Ti, Hf or Zr and R is alkyl or aryl.

Also candidates are substituted carbonyls of the form $[M(CO)_5(PPh_3)]^-$ or $[M(CO)_4(Ph_2PCH_2CH_2PPH_2)_2]^-$ wherein Ph is phenyl and M is V, Nb or Ta, $[Mo(CO)_6]$, $[Cr(CO)_6]$, $[ClRe(CO)_6]$, $[W(CO)_6]$, metal alkyl or aryl compounds such as tetraalkyl or tetraaryl lead, tin, germanium, or silicon, as well as di- or monohalogenated derivatives thereof, alkyl aluminum or cadmium, and M—M bonded species of these alkyl and aryl compounds such as hexaalkyl di-tin. Compounds such as [Nb(CO)$_6$], [Ta(CO)$_6$], [Fe$_2$(CO)$_9$] and [Fe$_3$(CO)$_{12}$], although somewhat unstable, can probably also be used if protected from oxidation by air.

Thus, as is evident from the foregoing description, the invention is not deemed to be limited to any particular species or class of photolyzable organometallic compounds, but rather encompasses the use of any such compounds identifiable by routine experiment falling with the scope of the appended claims.

We claim:

1. A method for producing an optical pattern in glass which comprises the steps of:
   (a) impregnating a porous glass article with a photolyzable organometallic compound selected from the group consisting of transition metal carbonyl, metal alkyl, and metal-aryl; and
   (b) exposing said article to a patterning source of photolyzing light to photolytically convert at least some of the organometallic compound in exposed areas of said glass to photolyzed intermediates which are stable against migration in the glass.

2. A method for producing an optical pattern in glass which comprises the steps of:
   (a) impregnating a porous glass article with a photolyzable organometallic compound selected from the group consisting of transition metal carbonyl, metal alkyl, and metal-aryl;
   (b) exposing said article to a patterning source of photolyzing light to photolytically convert at least some of the organometallic compound in exposed areas of the glass to photolyzed intermediates which are stable against migration in the glass; and
   (c) at least partially removing from the glass organometallic compound not photolytically converted.

3. A method in accordance with claim 2 wherein the photolyzable organometallic compound forms, upon photolysis, a photolyzed reactive intermediate capable of forming at least a coordination complex with the glass.

4. A method in accordance with claim 3 wherein the reactive intermediate is a coordinatively unsaturated organometallic complex.

5. A method in accordance with claim 2 wherein the photolyzable organometallic compound forms, upon photolysis, a reactive intermediate capable of forming a covalent bond with the glass.

6. A method in accordance with claim 5 wherein the reactive intermediate is a metal-centered organometallic radical.

7. A method in accordance with claim 2 wherein the photolyzable organometallic compound is a compound of a metal from Group IIIB, IVA, IVB, VB, VIB, VIIB or VIII of the Periodic Table.

8. A method in accordance with claim 7 wherein the photolyzable organometallic compound is a transition metal carbonyl.

9. A method in accordance with claim 8 wherein the photolyzable organometallic compound is a carbonyl of iron or manganese.

10. A method in accordance with claim 7 wherein the photolyzable organometallic compound is a compound of the formula: $R_{4-x}MX_x$, wherein R is aryl or alkyl of up to 24 carbon atoms, M is tin, germanium, lead or silicon, X is a halogen, and x has a value ranging from 0 to 3.

11. A method in accordance with claim 7 wherein M is tin.

12. A method in accordance with claim 2 wherein the organometallic compound is introduced into the porous glass as a component of a liquid solution.

13. A method in accordance with claim 2 wherein the organometallic compound is introduced into the porous glass as a vapor.

14. A method in accordance with claim 13 wherein only a surface layer of the porous glass article is impregnated.

15. A method in accordance with claim 2 wherein the porous glass article is composed of a high-silica glass.

16. A method in accordance with claim 15 wherein the porous glass article is composed of 96% silica glass, produced by a phase-separation and leaching process.

17. A method in accordance with claim 2 wherein the source of photolyzing light emits light in the 230–400 nm wavelength range.

18. A method in accordance with claim 2 wherein the source of photolyzing light emits visible light.

19. A method in accordance with claim 2 wherein the patterning light source comprises a combination of a photolyzing light source and an optical mask.

20. A method in accordance with claim 19 wherein the optical mask exhibits an optical density gradient in at least a portion thereo.

21. A method in accordance with claim 2 wherein the patterning light source comprises a moving light beam.

22. A method in accordance with claim 2 wherein the optical pattern is a pattern in optical density.

23. A method in accordance with claim 2 wherein the optical pattern is a pattern in refractive index.

24. A method in accordance with claim 23 wherein the pattern exhibits both refractive index and optical density variations.

25. A method in accordance with claim 22 wherein the optical pattern exhibits an optical density gradient.

26. A method in accordance with claim 23 wherein the optical pattern exhibits a refractive index gradient.

27. A method in accordance with claim 24 wherein the optical pattern exhibits both an optical density gradient and a refractive index gradient.

28. A method in accordance with claim 2 wherein the removal of unreacted organometallic compound from the glass is effected by heating.

29. A method in accordance with claim 28 wherein the heating is effected to visually enhance the optical pattern.

30. A method in accordance with claim 28 wherein the heating is carried out at a temperature sufficient to expel substantially all organic constituents from the glass.

31. A method in accordance with claim 30 wherein the heating is carried out in air.

32. A method in accordance with claim 30 wherein the heating is carried out in a reducing atmosphere.

33. A method in accordance with claim 2 wherein, following the removal of organometallic compound not photolytically converted, the glass is heated to a temperature sufficient to consolidate the pores thereof.

34. A method in accordance with claim 33 wherein the heating is carried out in air.

35. A method in accordance with claim 33 wherein the heating is carried out in a reducing atmosphere.

36. A method in accordance with claim 33 wherein, following pore consolidation, the glass is heated in a reducing atmosphere.

37. A method in accordance with claim 1 wherein, following exposure of the glass to a patterning source of photolyzing light, the glass is treated with a solution of a readily reducible absorbing ion to intensify the image formed by said exposure.

38. A method in accordance with claim 36 wherein the solution is a silver nitrate solution.

* * * * *